United States Patent [19]

Liyanage et al.

[11] Patent Number: 5,299,731
[45] Date of Patent: Apr. 5, 1994

[54] CORROSION RESISTANT WELDING OF STAINLESS STEEL

[75] Inventors: A. Nimal Liyanage, Chiyoda; Henri Chevrel, Tsukuba; Alain Boireau, Minato; Jean-Marie Friedt, Tokyo, all of Japan

[73] Assignee: L'Air Liquide, Paris, France

[21] Appl. No.: 47,554

[22] Filed: Feb. 22, 1993

[51] Int. Cl.$^5$ .................. B23K 9/16; B23K 35/365; B23K 35/38
[52] U.S. Cl. ............... 228/219; 228/220; 427/452; 427/580; 219/121.33; 219/121.51
[58] Field of Search .......... 228/219, 220, 42; 219/121.24, 121.33, 121.51; 427/452, 580

[56] References Cited

U.S. PATENT DOCUMENTS 4,646,958  3/1987  Howard, Jr. .................. 228/220

FOREIGN PATENT DOCUMENTS 60-61177  4/1985  Japan .................. 228/219
234969  6/1925  United Kingdom .................. 427/452

OTHER PUBLICATIONS

"Plasma Deposition of Amorphous Silicon," *NASA Tech. Briefs*, Spring 1981, p. 42.

Primary Examiner—Paula A. Bradley
Assistant Examiner—Jeffrey T. Knapp
Attorney, Agent, or Firm—Malcolm B. Wittenberg

[57] ABSTRACT

A process for welding stainless steel tubing in the presence of an inert gas comprising a silicon base gas, in particular silane $SiH_4$. During the welding operation, a suitable quantity of silicon is deposited by chemical vapor deposition at the weld joint to significantly improve the corrosion resistance of the weld.

16 Claims, 3 Drawing Sheets

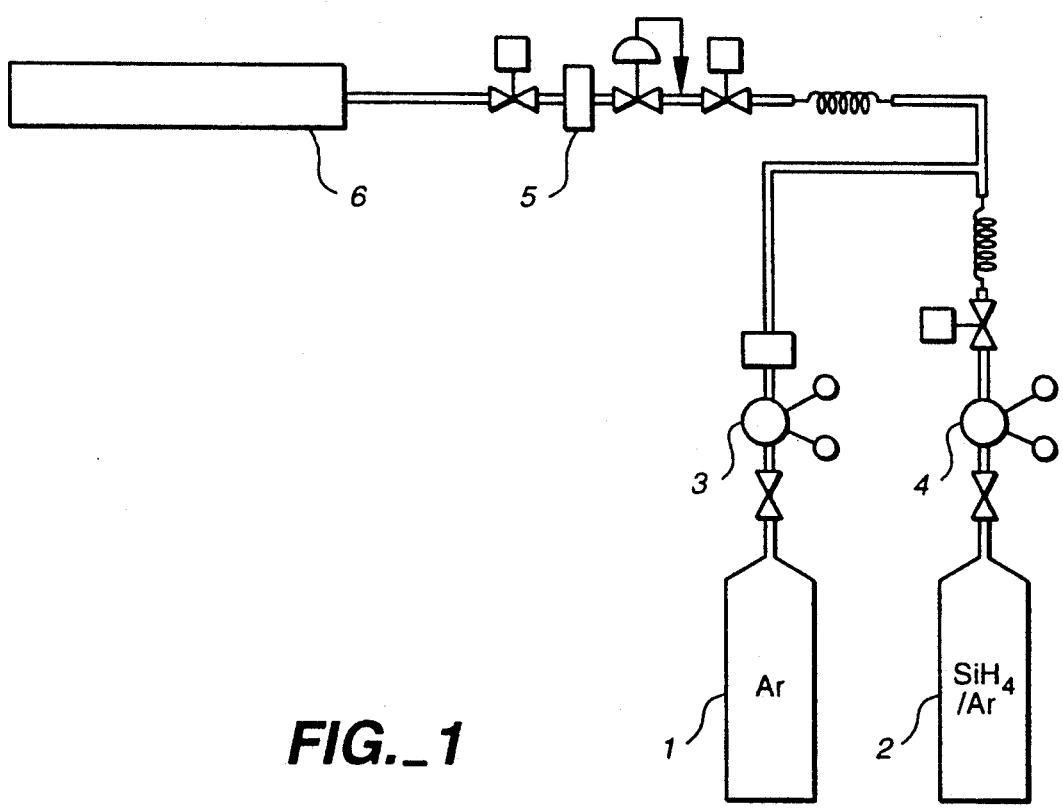
FIG._1

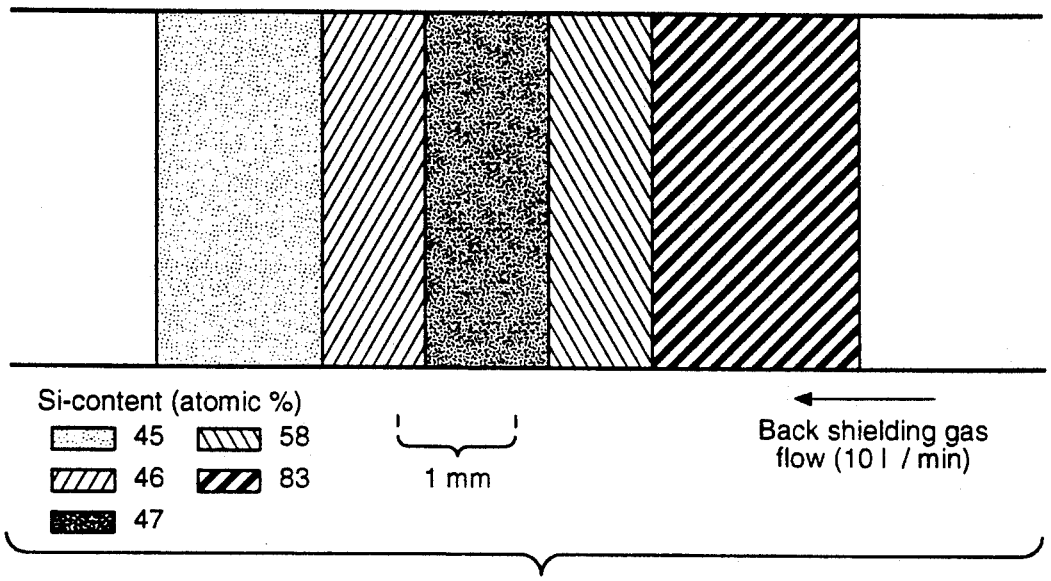
FIG._2A
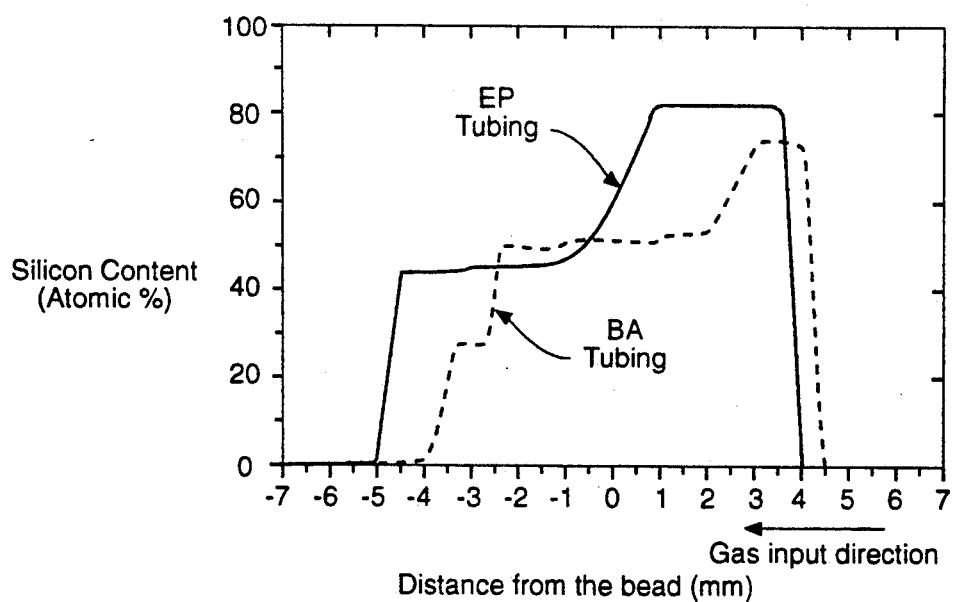
FIG._2B

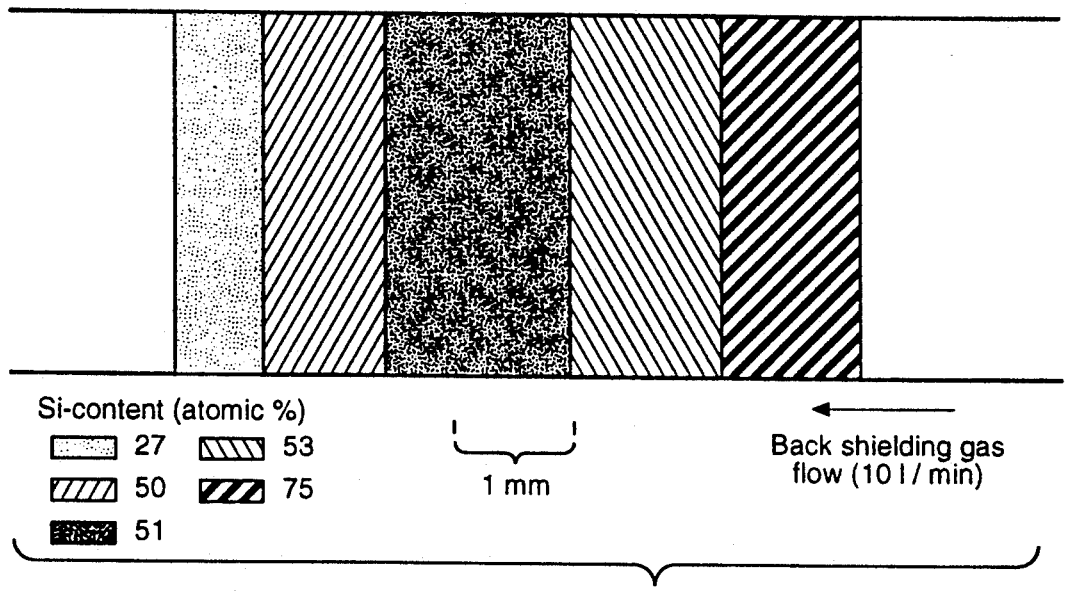
FIG._3
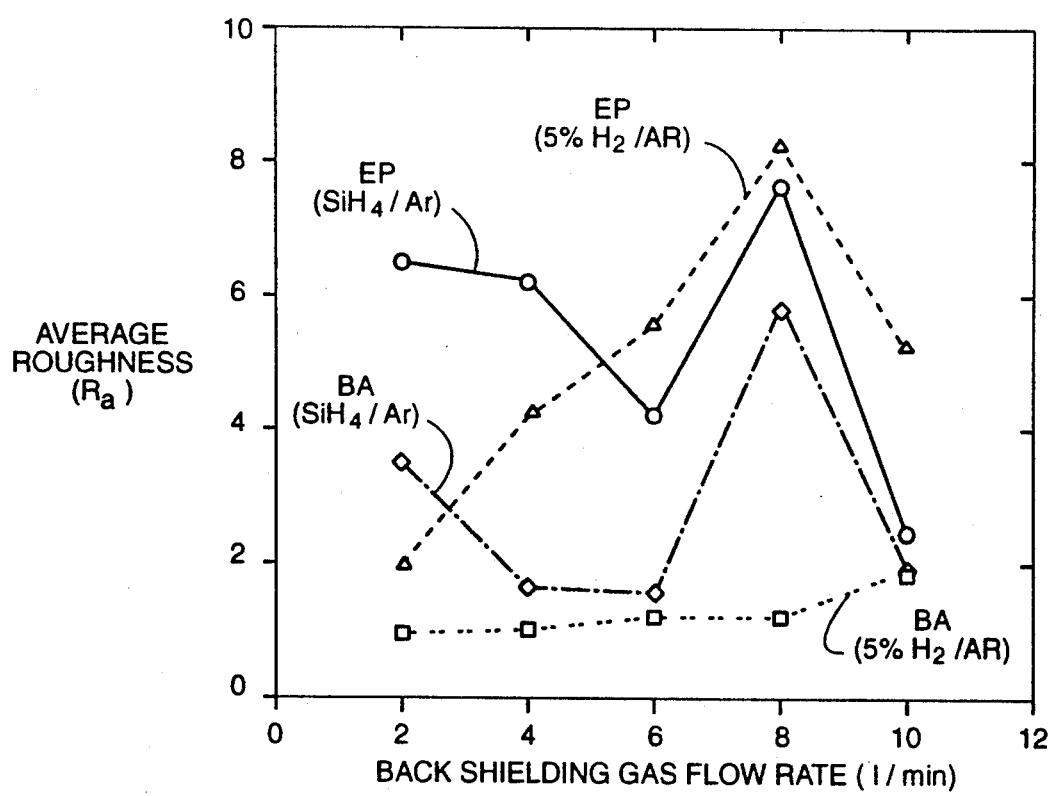
FIG._4

CORROSION RESISTANT WELDING OF STAINLESS STEEL

TECHNICAL FIELD OF INVENTION

Although surface treated stainless steel is quite corrosion resistant, areas in which stainless steel have been joined by welding are comparatively highly corrosion sensitive due to the destruction of surface passivation layers and possible metallurgical phase transformations in the heat affected zones. The present invention is intended to significantly improve corrosion resistance.

BACKGROUND OF THE INVENTION

It is reasonably well known that welding significantly reduces the corrosion resistance of stainless steels. For example, in the text entitled "Corrosion and Corrosion Control—an Introduction to Corrosion Science and Engineering" Third Ed., H. H. Uhlig, et al., it is taught that when austenitic stainless steels have been welded and then subjected to corrosive environments, failure of the austenitic stainless steel weld (called weld decay) occurs in a zone slightly away from the weld rather than at the weld itself. It is taught that, under certain conditions, rapid quenching from high temperatures can aid in improving corrosion resistance.

The use of silicon as a protective coating is fairly well known. For example, in an article appearing in the Journal of Material Science, Vol. 26, at pp. 9445-52 (1991) entitled "Chemical Vapor Deposition of Silicon Onto Iron: Influence of Silicon Vapor Phase Source on the Composition and Nature of the Coating", it was taught that Armco iron could be treated with a gas mixture of argon, silane and hydrogen. It was taught that this gas mixture, when applied at a range of 750° to 1100° C., provided a non-porous and adherent solid solution with a maximum silicon content of 6% (by weight). It was hypothesized that such a mixture lead to the nucleation of $Fe_3Si$, the growth of which occurred from and around the open porosity of the coating.

It is known that stainless steel, and particularly 316 L stainless steel, is exceedingly corrosion resistant. In fact, tubing made of 316 L stainless is the conduit of choice in microelectronics and semiconductor manufacturing facilities where such tubing is required for the delivery of corrosive gases. The stainless steel tubing is made even more corrosion resistant by conducting various well known surface treating operations such as electropolishing, oxygen passivating and bright annealing. Electropolished tubing is currently the preferred conduit in terms of impurity absorption and corrosion resistance.

It is also known from EP-A-512782 a method of surface passivating stainless steel by flushing the surface of stainless tube with argon and baking said tube at a temperature between 250° C. to 500° C. during at least four hours.

Stainless steel tubing is generally assembled by welding employing an orbital tungsten inert gas (TiG) or Metal Inert Gas (MiG) system. In such a process, an arc is established between a non-consumable electrode such as tungsten or a tungsten alloy and the L stainless steel based metal. Like all other welding processes, the necessary heat is supplied by an arc which is initiated and maintained by the electrical energies supplied by a power source. A constant current power source, either AC or DC or combined AC-DC is used with the process.

A torch of an appropriate design connected to hoses and cable holds the electrode, dispenses the inert gas, cools the torch head, if coolant is used, and supplies energy to the electrode. The arc is highly concentrated and can produce temperatures up to 19,425° C.

The weld puddle and arc area are protected against contamination from oxygen and nitrogen contained in the atmosphere by a shield of inert gas. The inert gas is generally a member selected from the group consisting of Ar, He, $H_2$ a mixture of Ar and He, a mixture of He and $H_2$, and mixtures thereof. Other contaminants like moisture, dust, metallic particles in suspension, etc., are also prevented from contacting the metal in its liquid state or during the solidification process.

Despite the fact that stainless steel, and particularly 316 L stainless steel, is known to be extremely corrosion resistant, corrosion sensitivity increases dramatically in both the liquid and gas phases within a zone including and surrounding the welding bead. As a result, conduit failures have been commonplace despite the use of 316 L stainless having been surface treated. The weld joints fail long before the stainless steel tubing suffers any ill effects from its contact with liquid and gaseous corrosive fluids.

It is thus an object of the present invention to provide a process for rendering such weld joints resistant to attack by corrosive gases and liquids.

It is yet another object of the present invention to provide a process for rendering the weld joints of 316 L stainless steel resistant to attack by corrosive gases and liquids in a convenient manner without significantly adding to the cost or complexity now experienced in carrying out ordinary orbital tungsten inert gas welding.

These and further objects would be more readily apparent in considering the following specification and appended claims.

SUMMARY OF THE INVENTION

The present invention is directed to a process for welding stainless steel. The welding process is improved by forming a coating comprising silicon in an area at and surrounding the weld. Preferably, 316 L stainless steel tubing is employed which has been surface treated by a method selected from the group consisting of electropolishing, oxygen passivating and bright annealing. However, the present invention applies also to any kind of stainless steels such as those exemplified in "Steel Products Manual: Stainless and heat resisting steels" pp. 18-20, American Iron and Steel institute. Welding takes place in the presence of an inert gas preferably by using a process of orbital tungsten inert gas (TiG) welding. The silicon coating is created by maintaining a suitable quantity of silicon containing gas, at and surrounding the weld during the welding operation. This silicon containing gas is usually a silicon hydride, preferably silane. However, $Si_2H_6$, $SiCl_4$, $SiH_2Cl_2$, $SiF_4$ or siloxanes can be used. The silicon containing gas is generally maintained at a concentration which is less than 10% volume at ambient pressure, and preferably between 0.01% and 2% (by volume) based upon a quantity of inert gas in the area at and surrounding the weld.

Before welding, and particularly for tube welding, a purge is made in the surrounding and/or in the tube by injection of an inert gas in the tube, such as Argon, helium, Nitrogen, hydrogen, etc. However, gases such as nitrogen and hydrogen are usually avoided or used in a limited concentration, due to their reaction with metals, particularly if said purge is not done at ambient temperature (which is more simple) but is done at higher temperature to improve degassing of the surface. (The temperature can be as high as 700° C., but is preferably limited to 120° C. or less). Said purge is usually done at atmospheric pressure.

The welding is done as usually done with MiG or TiG welding, preferably in a controlled atmosphere, while air is still acceptable. Said welding is performed as explained hereabove by using a TiG or MiG gas comprising a silicon containing gas. During said welding the purge inside the tube can be continued with the same (or a different) gas mixture, preferably at the same atmospheric pressure. When the welding is completely performed, it is preferable to continue the said purge inside the said tube (or start a new purge step) in order to improve safety after the welding step, to cool down the weld and the tube and to reduce particle formation in the tube which is particularly important when the tube is further used to transport liquid, or gases used in the manufacture of e.g. silicon wafers or integrated circuits. However, it is quite possible to perform the welding process according to the invention without purge before or after (or both) the welding step.

DESCRIPTION OF THE DRAWINGS

FIG. 1 represents the back shielding gas supply system to make the tests according to the invention: the argon cylinder 1 and Silane/argon cylinders 2 are connected respectively through valve systems and flow meter means 5 to the welding (TiG) apparatus 6.

FIG. 2A exemplifies the lateral variation of the silicon content of the coating in BA tubes welded with the TiG process using 0.468% $SiH_4$ (volume) in argon gas as the shielding gas. The drawing is self-explanatory.
FIG. 2B shows the variation of the Si content of the coatings with the distance from the bead in BA and EP tubes. Here also the drawing is self-explanatory.

FIG. 3 represents the lateral variation of the Si content of the coating in EP tube welded using 0.468% silane (vol.) in argon as the back shielding gas.

FIG. 4 illustrates the variation of the average roughness with a back shielding gas flow rate in the BA and EP tubes welded using $SiH_4$/argon mixture or 5% $H_2$ (vol.) in argon gas mixture as the back shielding gas.

DETAILED DESCRIPTION OF THE INVENTION

It comes as no surprise that welded joints behave differently than portions of tubing located remotely from the welded areas. Welding involves melting at high temperatures and surface oxidation is an expected result. However, it has been found that corrosion sensitivity in the heat affected zone can be minimized by forming a silicon coating substantially simultaneously with the welding operation. It has specifically been determined that by inclusion of a small quantity of silane gas, i.e. between approximately 0.01% to 2% (by volume) based upon the quantity of inert gas in the area at and surrounding the weld a silicon coating can be created which is particularly useful on a 316 L stainless substraight which has been surface polished by either electropolishing, oxygen passivating or bright annealing.

EXAMPLE 1

Tubular members comprising 316 L stainless steel surface coated by electropolishing were subjected to a purge gas comprised of 5% vol. hydrogen in argon at a flow rate of 10 l/min. for about ten minutes. The inner back shielding gas was then changed to a flow of 0.5% (volume) of silane $SiH_4$ in argon. The flow of this mixture was kept constant for about one minute and the welding carried out with a Cajon welding system 100DJR TIG welding machine having the following parameters:

| | |
|---|---|
| Pulse welding (frequency) | 0 Hz |
| Electrode | Tungsten |
| Electrode tubing gap | 0.875 mm |
| Current impulse height | 15–20 A |
| Lower current maintenance | 15–20 A |
| Duty cycle | 50% |
| Start current | 50 A |
| Duration | 0.15 s |
| Prepurge | 10 s |
| Dwell time | 20 s |
| Down slope time | 4 s |
| Postpurge time | 20 s |
| Max. speed | 50% |

Immediately after welding, the tube was purged again with a mixture of 5% vol. $H_2$ in argon for about one minute by switching over from the $SiH_4$/Ar flow to said mixture. This process was carried out at flow rates of 2, 3, 4, 5, 6, 8 and 10 l/min. Properties of the resulted coatings such as Si-content, liquid phase and gas phase corrosion resistance and surface roughness were then measured.

It was noted that the width of the coating changed slightly with the flow rate of $SiH_4$/Ar with a representative value of about 8 mm. Electron energy dispersive spectroscopy analysis revealed that the Si content of the coatings varied along the tube axis between 5 and 65 atomic %. It was also observed that the average surface roughness of the welded region using 0.5% $SiH_4$ (volume) in argon was not significantly changed when using $SiH_4$ containing back shielding gas compared to the $H_2Ar$ mixture under the same conditions. The exposure of Si-coated welded sites to a solution of 3.3% $FeCl_3$/5.7N HCl at room temperature displayed only minor corrosion spots after four hours exposure whereas uncoated parts corroded significantly even after one hour exposure.

EXAMPLE 2

TiG welding was carried out under the same conditions as employed in Example 1 with the outside shielding gas being argon used at a rate of 10 l/min. The inside of the pipe was purged for five minutes with argon prior to the introduction of a mixture of 0.05% silane in argon also used at a rate of 10 l/min. After welding, the tubing was exposed to a vapor composed of HBr solution (47%) at room temperature for 25 hours. It was observed that the welding bead and its vicinity coated with silicon were not corroded compared with the uncoated part of the pipe even after exposure to HBr vapor for 25 hours.

EXAMPLE 3

Tubes composed of one-quarter inch SUS 316 L having been surface treated by electropolishing and bright annealing were employed. The composition of the SUS 316 L tubing was as follows:

| Element | Fe | Cr | Ni | Mo | Mn | Si | C | P | S |
|---|---|---|---|---|---|---|---|---|---|
| atomic % | 60–62 | 16–18 | 10–14 | 2–3 | 2 | 1 | 0.03 | 0.05 | 0.03 |

The surface of the BA tubing was not very smooth ($R_a=0.27$ μm) due to the existence of scratches. However, the electropolished surface was very smooth ($R_a=0.1$ μm) being covered by a thin (30–50 Å) Cr-rich passivation layer.

The tubing was installed in a fixture block of the welding apparatus (Cajon CWS - 100DJR). Both the inside and outside of the tubes were purged for about ten minutes employing Argon and a mixture of 5% vol. $H_2$ in Ar. The purging gas flow rate was maintained at 10 l/min. After purging, the inner back shielding gas was switched over to $SiH_4/Ar$ and purged again for about one minute. Then, the welding was carried out according to normal procedure and atmospheric pressure. Immediately after welding, the tube was purged again with said 5% vol. $H_2$ in Argon mixture for about one minute by changing the $SiH_4/Ar$ flow to said mixture. This procedure was carried out by various flow rates of $SiH_4/Ar$ as follows:

| BACK SHIELDING GAS FLOW RATE (liter/min.) | | PRESSURE |
|---|---|---|
| Inside the tube (0.468% $SiH_4/Ar$) | Outside the tube 5% vol. $H_2$ in Ar. | |
| 2 | 10 | atmospheric |
| 4 | " | " |
| 6 | " | " |
| 8 | " | " |
| 10 | " | " |

After the above was accomplished, the welded tubes were cut into halves by a diamond cutter in order to examine surface properties. The surface Si concentration on the welding bead and heat affected zones was measured by Energy Dispersive X-ray Spectroscopy. A Mitutoyo Suftest-402 roughness tester was used to determine the average surface roughness of the welded zone. It was determined that a 15 mm portion of the tube comprised the welding bead, heat affected and unaffected zones. The zones were subjected to corrosion in the form of 3.3% $FeCl_3/5.7N$ HCl solution for six hours. After each hour, the samples were removed from solution, washed with de-ionized water and dried in nitrogen. Subsequently, the tubes were reimmersed in fresh corrosive solution.

The Si-based coatings occurred in both the welding bead and heat affected zones after welding. It was noted that the coatings were not homogeneously distributed on both sides of the welding bead. In the bright annealed tubes, Si coating widths varied randomly (7.7 to 8.3 mm) with the inner back shielding ga ($SiH_4/Ar$) flow rate. However, for the electropolished tubes, widths gradually increased with flow rate from 7.1 to 8.0 mm as noted as follows:

| BACK SHIELDING GAS FLOW RATE (l/min) | WIDTH OF THE COATINGS (mm) | |
|---|---|---|
| | BA tube | EP tube |
| 2 | 7.7 | 7.1 |
| 4 | 8.1 | 7.1 |
| 6 | 7.9 | 7.2 |
| 8 | 8.3 | 7.3 |
| 10 | 8.2 | 8.0 |

Generally, it was noted that the width of the coatings measured on bright annealed tubes was higher than that of the electropolished tubes. It was further noted that the Si content of the coatings gradually decreased along the tube from the back shielding gas inflow into the opposite end. At a flow rate of 10 l/min., the Si content throughout the coatings in the bright annealed tubes varied from 45 to 83 and in the electropolished tubes from 27 to 75 atomic %.

The average roughness of the welded region of both the bright annealed and electropolished tubes fluctuated with the back shielding gas flow rate of $SiH_4/Ar$ and the 5% vol. $H_2$ in Argon mixture. However, at 10 l/min. back shielding gas flow rate, the average roughness of the tubes welded by $SiH_4/Ar$ became similar or better than those welded by Noxal.

| BACKSHIELDING GAS | AVERAGE ROUGHNESS (μm) | | |
|---|---|---|---|
| $SiH_4/Ar$ | 2.7 | 3.5 | 4.3 |
| 5% vol $H_2$ in Argon | 5.0 | 5.2 | 5.4 |

It was observed that the welded regions of both the bright annealed and the electropolished tubes welded using $SiH_4/Ar$ as the back shielding gas were remarkedly resistant to wet or pitting corrosion when compared to tubes which were not coated with silicon. The welded regions of the tubes welded using $SiH_4/Ar$ (Si-coated region) remained nearly completed intact even after six hours of immersion in the corrosive 3.3% $FeCl_3/5.7N$ HCl solution except for a few points of minor corrosion. It was also concluded that the most ideal flow rate for the silane gas was at approximately 10 l/min. Above that flow rate, the possibility of producing particles during welding was high.

We claim:

1. A process of welding stainless steel under a gaseous atmosphere comprising a silicon containing gas or gas mixture, the process comprising forming a coating comprising silicon in an area at and substantially surrounding the weld by using said gaseous atmosphere during welding in the region where welding occurs.

2. The process of claim 1 wherein said stainless steel comprises 316 L.

3. The process of claim 1 wherein said stainless steel has been surface treated by a method selected from the group consisting of electropolishing, oxygen passivating and bright annealing.

4. The process of claim 1 wherein said welding is selected from the group comprising orbital tungsten inert gas (TiG) welding and metal inert gas (MiG) welding.

5. A process according to claim 1, wherein the silicon containing gas or gas mixture comprises a silicon hydride.

6. A process according to claim 2, wherein the silicon hydride is silane.

7. The process of claim 1 wherein said welding is carried out by maintaining a quantity of inert gas in the area at and surrounding the weld.

8. The process of claim 6 wherein said inert gas comprises a member selected from the group consisting of Ar, He, $H_2$, $N_2$ a mixture of Ar and He, a mixture of He and $H_2$ and mixtures thereof.

9. The process of claim 6 wherein said silicon coating is created by maintaining a suitable quantity of silicon containing gas at and surrounding the weld during the welding operation.

10. The process of claim 9 wherein said silicone containing gas is maintained at a concentration between approximated 0.01% and 2% (by volume) based upon the quantity of inert gas in the area at and surrounding the weld.

11. A process for welding stainless steel tubing comprising shielding the weld region with inert gas selected from the group consisting of Ar, He, $H_2$, $N_2$ a mixture of Ar and He, a mixture of He and $H_2$ and mixtures thereof, said inert gas being caused to purge the weld region prior to commencing the welding process, and forming a coating comprising silicon by introducing and maintaining during the welding operation a silicon containing gas or gas mixture in the region at and surrounding the weld.

12. The process of claim 11, wherein said welding process comprises orbital tungsten inert gas welding and metal inert gas welding.

13. The process of claim 11, wherein said inert gas is maintained at a flow rate of approximately 10 liters/min. during the welding process.

14. The process of claim 11, wherein said stainless steel has been surface heated by a method selected from the group consisting of electropolishing, oxygen passivating and bright annealing.

15. A process according to claim 11, wherein the silicon containing gas or gas mixture comprises a silicon hydride.

16. A process according to claim 11, wherein the silicon containing gas or gas mixture comprises silane.

* * * * *